(12) United States Patent
Okamoto (10) Patent No.: US 6,683,601 B2
(45) Date of Patent: Jan. 27, 2004

(54) ELECTRONIC APPARATUS INCLUDING PEN

(75) Inventor: Kazuo Okamoto, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 243 days.

(21) Appl. No.: 09/842,186

(22) Filed: Jul. 20, 2001

(65) Prior Publication Data

US 2002/0047834 A1 Apr. 25, 2002

(30) Foreign Application Priority Data

Oct. 25, 2000 (JP) ........................................ 2000-325306

(51) Int. Cl.$^7$ .............................................. G08C 21/00
(52) U.S. Cl. ...................... 345/179; 345/156; 345/163; 345/173; 345/177; 178/18.01; 178/18.02; 178/18.03; 178/18.04; 178/18.05; 178/18.06; 178/18.07; 178/18.08; 178/19.01; 178/19.02; 178/19.03; 178/19.04; 178/19.05
(58) Field of Search .................................. 345/173, 177, 345/179, 156, 163; 178/18.01–18.08, 19.01–19.05

(56) References Cited

U.S. PATENT DOCUMENTS 6,088,021 A * 7/2000 Yong ........................... 345/163

* cited by examiner

*Primary Examiner*—Richard Hjerpe
*Assistant Examiner*—Jean Lesperance
(74) *Attorney, Agent, or Firm*—Wenderoth, Lind & Ponack, L.L.P.

(57) ABSTRACT

Disclosed is a user-friendly electronic apparatus having a pen and a panel as the input devices. The pen is tethered to the apparatus by a cord on which position data is recorded along its length direction. Responding to the readout of the position data, the CPU controls the reel-in operation according to the standby mode or the sleep mode of the apparatus. As the pen is held at a proper position on the apparatus by the CPU's control, the user is free from worrying about dropping, spoiling, or losing the pen. Besides, the operation of reeling-out the pen from a housing position in the apparatus allows the apparatus to automatically come back into an active mode from its sleep mode or standby mode.

13 Claims, 8 Drawing Sheets

ELECTRONIC APPARATUS INCLUDING PEN

FIELD OF THE INVENTION

The present invention relates to a pen included with an electronic apparatus, more specifically, relates to a pen as an input device included with a wide variety of systems, such as a personal digital assistant (PDA), a personal intelligent communicator (PIC), a personal wireless assistant (PWA), a personal computer (PC), a notebook PC, a wearable PC, a digital video camera (DVC), a digital still camera (DSC), a mini disc (MD) camera, a digital video disc (DVD) camera, a cellular phone, a personal handy phone system (PHS), and a car navigation system.

BACKGROUND OF THE INVENTION

Most of the prior-art pen-based electronic apparatuses have been equipped with a separate type pen, without a cord tying it to the apparatus. Besides, pens have relatively cheap plastic-made structures.

Such a non-tethered structure has often presented some problems for users—when taking it out from/into the apparatus, or putting it on a desk or other places within reach before getting the phone, the pen is easily dropped and might be damaged, or may be forgotten. As a result, the apparatus becomes practically useless, or even if it functions, the user has to be patient with an inconvenience.

To address the problems above, Japanese Utility Model Laid-Open No. 4-28338 discloses an improved method. According to the method, a cord-tied pen is manually reeled into the apparatus, protected it from dropping or losing. With the method, however, an inconvenience persists: the user has to pull out the pen by hand from the apparatus before operation, and after use, the cord tied to the pen has to be manually reeled-in to accommodate it to the apparatus.

SUMMARY OF THE INVENTION

The present invention addresses the problems above. It is therefore the object of the present invention to provide an electronic apparatus including a pen with easy handling. According to the invention, reeling-in and reeling-out of cord are automatically controlled depending on each operation state of an active mode, a semi-active mode (hereinafter referred to as a standby mode), and an inactive mode (hereinafter referred to as a sleep mode.)

To realize the objective above, the electronic apparatus of the present invention is structured below.

(1) The apparatus having a pen and a panel as the input devices includes:

a cord tied to the pen;

a cord-reel section reeling-in the cord;

a rotating section rotating the cord-reel section; and a control section requesting the rotating section to reel-in the cord.

When the pen is not used, the control section requests the rotating section to reel-in the cord, so that the pen is automatically accommodated into the apparatus.

Furthermore, the electronic apparatus of the invention may be embodied as (2) through (8) below.

(2) The cord described above may be the one on which position data are recorded. In this case, two sections are additionally included. They are a readout section reading the position data and a determining section determining the position to which the cord should be reeled in the apparatus. When the pen is not used, according to the request from the control section, the rotating section rotates the cord-reel section to reel-in the cord until the position where the readout position data corresponds to the determined position data. As a result, the pen is accommodated in a proper position.

(3) The reel-in operation can be performed through a sleep-mode virtual button. The apparatus includes a display laid beneath the panel and the button appears on the display. When the user touches, with the pen, the position on the panel corresponding to the button on the display, the control section requests the rotating section to reel-in the cord. As a result, the pen is automatically housed into the "sleep position"—housing hole—in the apparatus, and the apparatus goes into the sleep mode as well.

(4) In response to pulling out the pen from the apparatus in the sleep mode, the control section may allow the apparatus to come back into the active mode from the sleep mode.

(5) A pair of magnets may be added to the structure described above. The magnets attracting with each other are attached to proper positions of the structure—one is for the pen, the other is for the housing of the electronic apparatus. The apparatus includes a display laid beneath the panel and a standby-mode virtual button appears on the display. When the user touches, with the pen, the position on the panel corresponding to the button on the display, the control section requests the rotating section to reel-in the cord. In this case, the cord is reeled up to the apparatus until the position where the two magnets can attract with each other (hereinafter referred to as a standby position.) This operation allows the apparatus to go into the standby mode.

(6) In response to pulling out the pen from the apparatus in the standby mode, the control section may allow the apparatus to come back into the active mode from the standby mode.

(7) In addition to the structure described earlier, the apparatus may include a timer to which a predetermined time for the active mode has been set. When the timeout occurs, the control section requests the rotating section to reel-in the cord, so that the pen is automatically accommodated into the "sleep position"—housing hole—in the apparatus, and the apparatus goes into the sleep mode as well.

(8) In addition to the structure described earlier, the apparatus may include a timer to which a predetermined time for the active mode has been set. When the timeout occurs, the control section may request the rotating section to reel-in the cord, so that the cord is reeled into the apparatus until the standby position described above, allowing the apparatus to go into the standby mode.

According to the present invention, as described above, the cord connected with the pen is automatically reeled up to a position depending on the modes—the active mode, the standby mode, and the sleep mode—of the apparatus. This reel-in operation allows the users to use such a pen with a great convenience without worrying about dropping or loosing it.

DESCRIPTION OF THE PREFERRED EMBODIMENTS

The preferred embodiments of the present invention are described hereinafter with reference to the accompanying drawings.

First Preferred Embodiment

Figure 1:
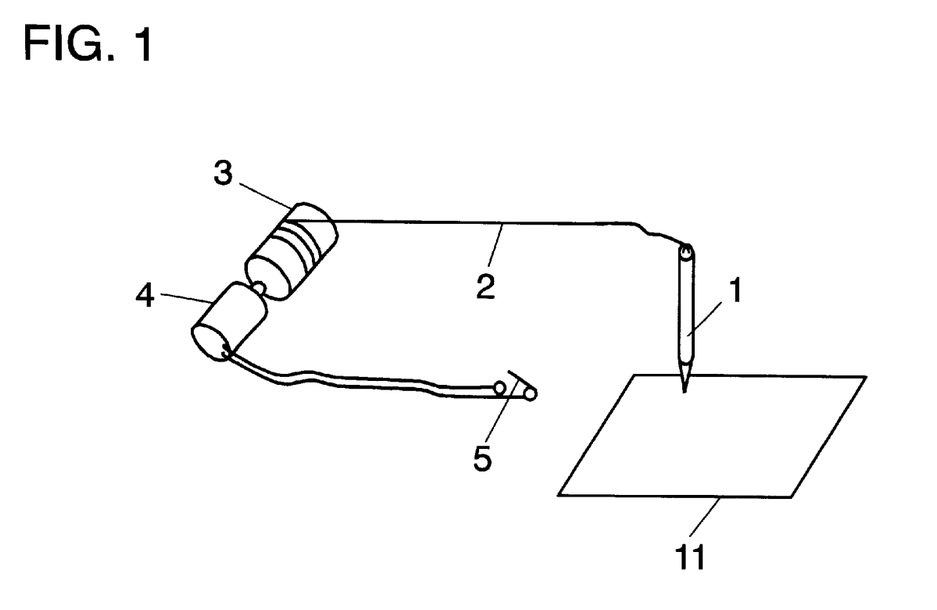
FIG. 1 is a block diagram illustrating the pen reeled into the electronic apparatus in accordance with a first preferred embodiment of the present invention.

FIG. 1 shows a block diagram of the electronic apparatus according to the first preferred embodiment of the present invention.

Using pen 1, the user operates panel 11 disposed on the electronic apparatus. As shown in FIG. 1, cord 2 is connected at the top of pen 1. For accommodating pen 1 into the apparatus, the user operates switch 5 to rotate stepper motor 4. This rotation also rotates reel drum 3 linked with the stepper motor in the reel-in direction of cord 2. In this way, the apparatus can accommodate pen 1 connected with cord 2 therein. Switch 5 turns stepper motor 4 on/off and controls the rotation between the positive and the reverse directions.

The by the cord is thus free from getting dropped or lost during operation or in its "taking-along" situation. Besides, the user can quickly accommodate the pen into the apparatus with a simple operation. That is, such structure realizes an electronic apparatus having a pen that can be accommodated into the apparatus without the inconvenience of reeling-in the cord by hand.

Second Preferred Embodiment

Figure 2:
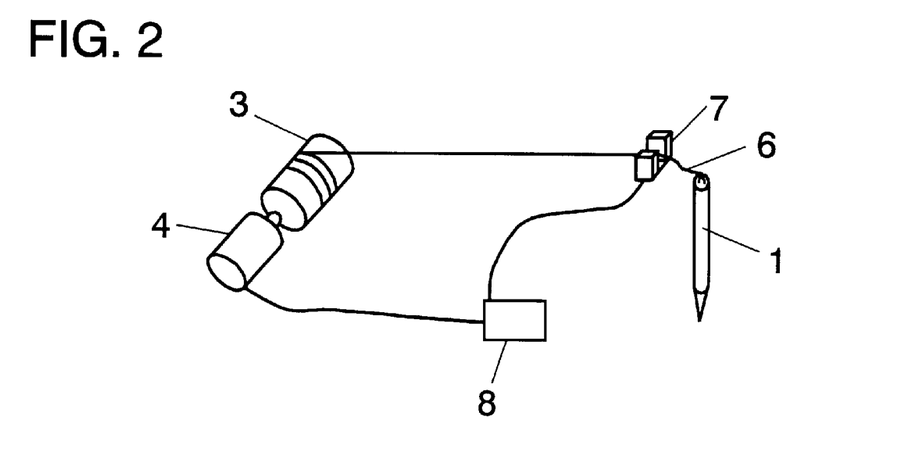
FIG. 2 is a block diagram illustrating the pen reeled into the electronic apparatus in accordance with a second preferred embodiment of the present invention.

FIG. 2 shows the structure of the electronic apparatus according to the second preferred embodiment of the present invention.

The structure in the embodiment differs from that described in the previous embodiment, as shown in FIG. 2, in that the position data is pre-recorded on cord 6, and sensor 7 including a photo coupler for reading out the position data is additionally provided. As another difference, the apparatus in the embodiment has central processing unit (CPU) 8 instead of switch 5 shown in FIG. 1. CPU 8 generates pulses to control the number of revolutions and the rotation angle of stepper motor 4 according to signals indicating the position data transmitted from sensor 7. The structure also includes reel drum 3 and stepper motor 4 in the same way as that of the first preferred embodiment.

Figure 3:
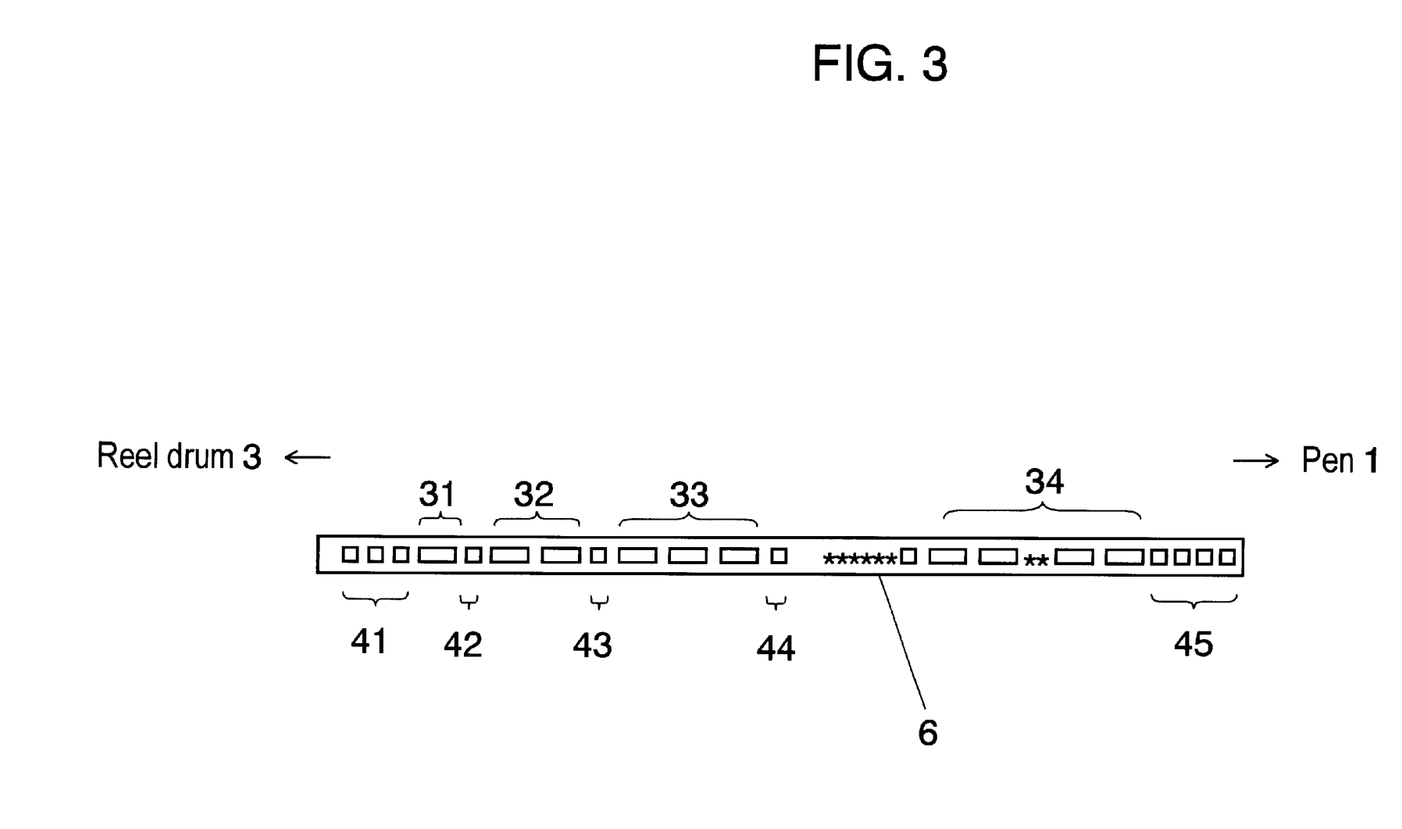
FIG. 3 indicates how the position data is recorded on the cord attached to the pen in accordance with the second preferred embodiment of the present invention.

FIG. 3 indicates how the position data is recorded on cord 6 along its length according to the embodiment.

As shown in FIG. 3, cord 6 alternately retains the data signals indicating each position of the cord—hereinafter simply referred to as data signals—(1) 31, (2) 32, (3) 33, . . . , (n−1) 34, and the synchronization signals (1) 41, (2) 42, (3) 43, (4) 44, . . . , (n) 45 that identify the data signals. The data signals take on natural numbers incremented by 1 until n, with the closest one to reel drum 3 given 1. At least one synchronization signal is sandwiched between each data signal.

A data signal is represented as a 3-mm per unit-length black bar, while a synchronization signal is represented as a 1-mm per unit-length black bar. As shown in FIG. 3, a 1-mm white-colored part lies between these signals.

Now will be described the movement of pen 1 in the reel-out and reel-in operations of the embodiment, referring to FIGS. 2 and 3.

A) Reeling-out the Pen from the Apparatus

When pen 1 is completely housed in the apparatus, cord 6 is reeled up to drum 3 and stepper motor 4 is in the OFF state having no torque to the positive nor reverse rotation—the state is referred to as an initial state.

Pen 1 being in the initial state can be easily reeled out from the apparatus since stepper motor 4 is in the OFF state.

As pen 1 is reeled out, CPU 8 recognizes the position of cord 6 by reading the data signals, for example, data signal (3) 33, which is detected by sensor 7.

In response to the detection of synchronization signal (3) 43 detected by sensor 7, CPU 8 applies a low torque to stepper motor 4 to stop its operation.

When the user pulls out of cord 6 with a higher torque than CPU 8 applied to, sensor 7 detects coming data signal (2) 32 and CPU 8 accordingly releases the torque from stepper motor 4.

Such a series of movements is repeated until the user stops reeling-out pen 1. The mechanism suppresses the inertial force of reel drum 3, keeping cord 6 from having further exposure.

Figure 4:
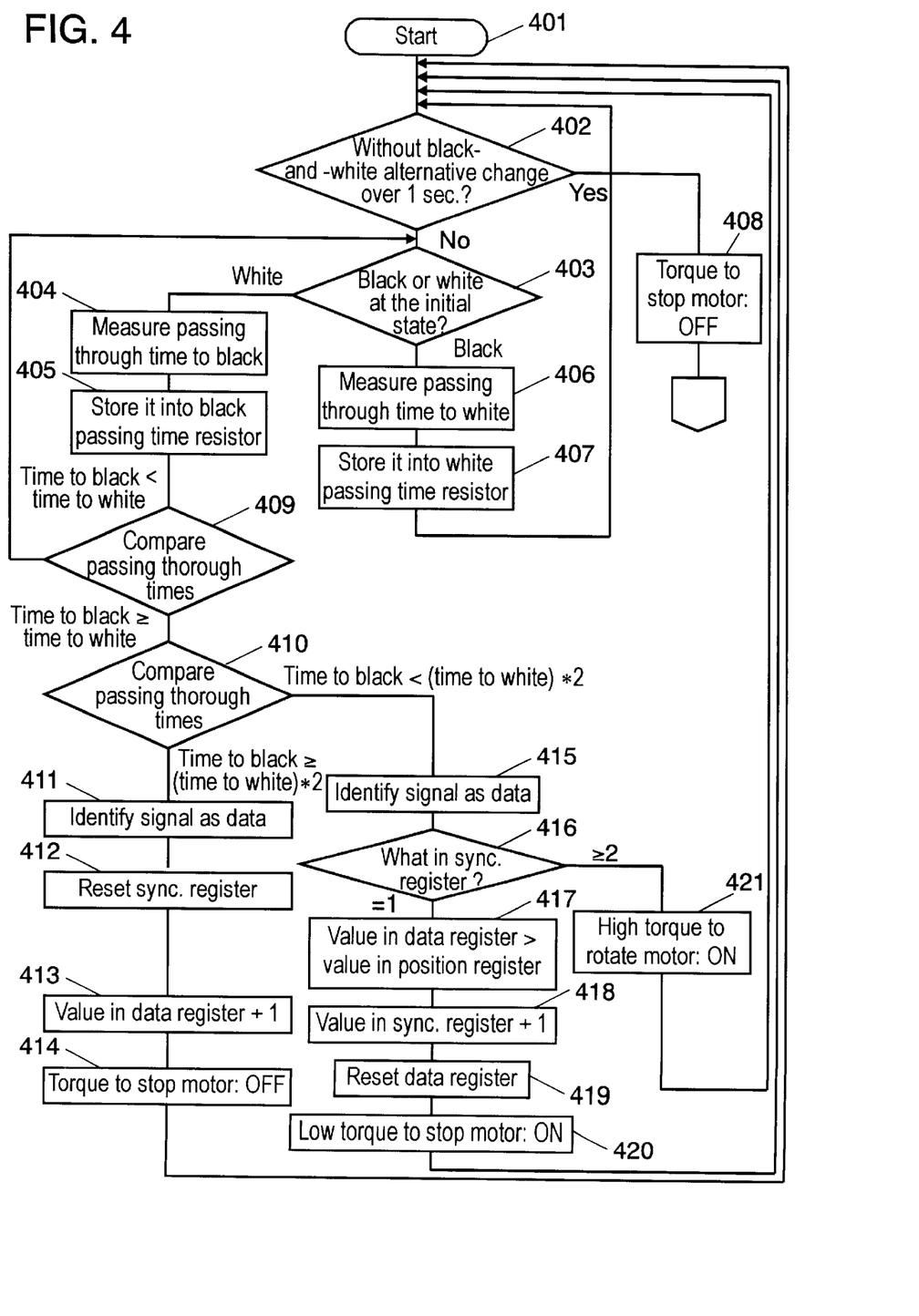
FIG. 4 is a flow chart illustrating the procedure for reeling-out the cord-tied pen in accordance with the second preferred embodiment of the present invention.

Now referencing to the flow chart of FIG. 4, the procedures of reeling-out the cord according to the embodiment will be described step by step.

(1) CPU 8 judges whether the cord is moved in Step 402: CPU 8 determines that the cord is moved if sensor 7 detects a black-and-white alternative change lasting over 1 second. Otherwise, the torque to stepper motor 4 is set OFF for conserving power in Step 408.

(2) When the black-and-white alternative change lasts more than 1 second, CPU 8 further judges which color is detected at the initial state.

(2a) When the black comes at the initial state, CPU 8 measures the passing-through time required to the white that follows the black in Step 406 and stores the measured time into the resister for the white passing-through time in Step 407. After that, the flow goes back to Step 402 for judging the signal coming next.

(2b) When the white comes first, CPU 8 measures the passing-through time required to the black that follows the white in Step 404 and stores the measured time into the resister for the black passing-through time in Step 405, then continues to Step 409.

(3) In Step 409, the two values, which have been stored in resisters for the white and the black in Step 407 and Step 405, respectively, are compared with each other. If the white passing-through time is longer than the black passing-through time, CPU 8 recognizes that the unreasonable result is caused by a wrong signal or noise and determines that the cord has no move, then controls the flow back to Step 403.

(4) If the black passing-through time is longer than the white passing-through time—the true result when the cord has been reeled out, CPU 8 further compares the value of the black passing-through time with the doubled value of the white passing-through time in Step 410.

If the value for the black is greater than the doubled value for the white, the black signal is identified as a data signal, even allowing for an error, according to the fact that the unit length of the black data signal is three times longer than that of the white part with no signal in Step 411.

Since the detected signal is not a synchronization signal, CPU 8 resets the resister for synchronization signals in Step 412, then increments the counter of the resister for data signals by 1 in Step 413. After that, CPU 8 makes the torque to turn the motor OFF, allowing the cord to be reeled out more in Step 414.

(5) On the other hand, if the value for the black is smaller than the doubled value for the white, CPU 8 identifies the detected signal as a synchronization signal in Step 415, and determines whether the value stored in the resister for synchronization data equals to 1, or at least 2 in Step 416.

(5a) When identifying the value in the resister for synchronization data is equal to 2 or greater, CPU 8 judges that the cord is thoroughly reeled out from the apparatus. CPU 8 therefore applies a high torque to stepper motor 4 to prevent the cord from having further exposure in Step 421.

(5b) When identifying the value in the resister for synchronization data is equal to 1, CPU 8 stores the content of the resister for data signals into the position resister for backup in Step 417, increments the contents of the resister for synchronization signals by 1 in Step 418, then resets the counter of the resister for data signals in Step 419. After that, CPU 8 applies a low torque to stepper motor 4 to suppress the inertial force of reel drum 3, keeping the cord from further exposure in Step 420.

B) Reeling-in the Pen to the Apparatus

Now suppose that the cord is thoroughly reeled out from the apparatus. When accommodating the pen into the apparatus, CPU 8 sends out a reel-in signal to stepper motor 4. Responding to the signal, reel drum 3 starts to reel-in cord 6. CPU 8 recognizes the position of cord 6 by reading the data signal, for example, data signal (3) 33, detected by sensor 7: in the meantime, CPU 8 recognizes that the cord is completely reeled up by accepting synchronization signal (n) 45 from sensor 7 then accordingly stops stepper motor 4.

In addition, CPU 8 stops stepper motor 4 at which there is no more acceptable synchronization signal after pen 1 has been completely housed in the housing hole in apparatus 14.

Figure 5:
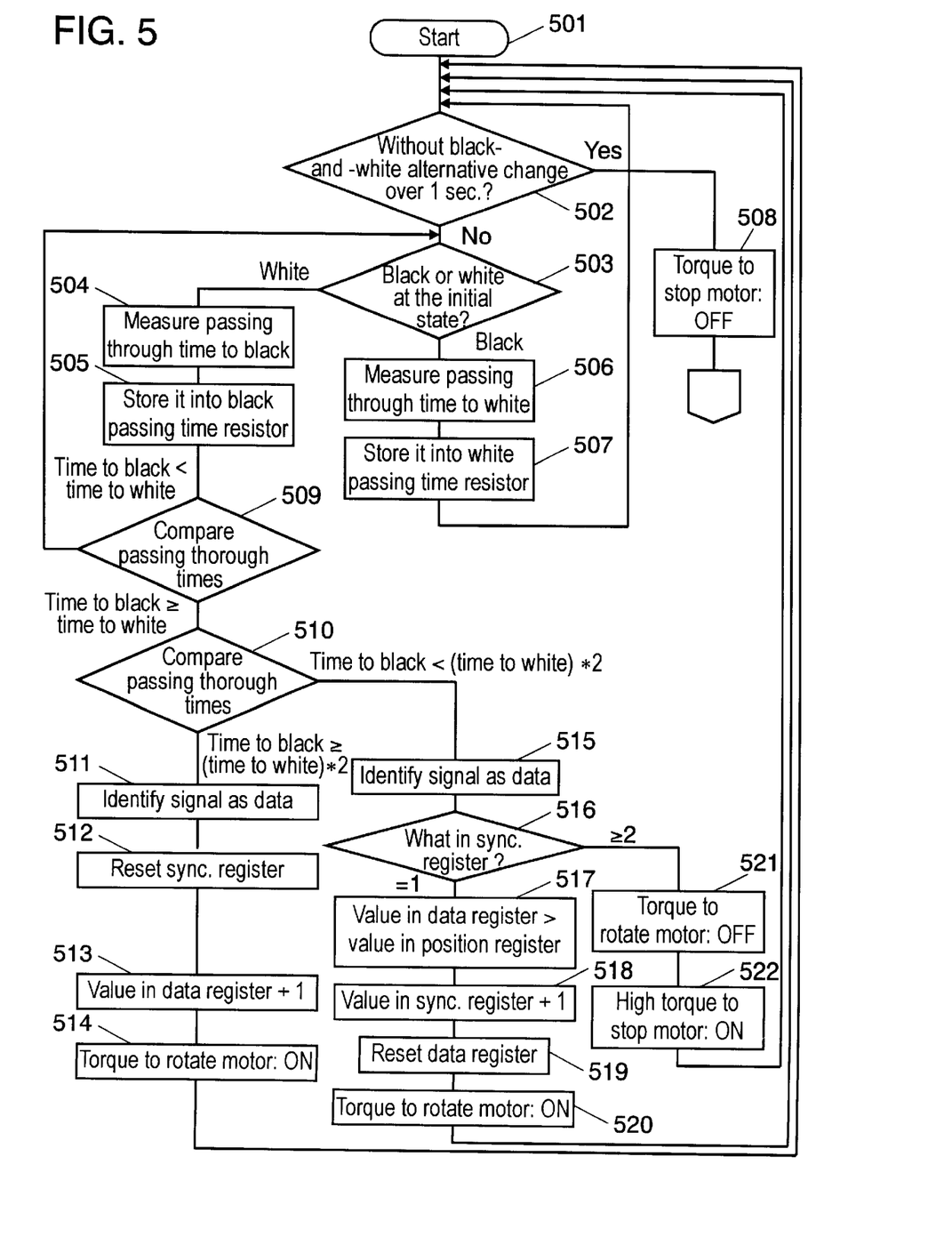
FIG. 5 is a flow chart illustrating the procedure for reeling-in the cord-tied pen in accordance with the second preferred embodiment of the present invention.

Now referencing to the flow chart of FIG. 5, the procedures of reeling-in the cord according to the embodiment will be described step by step.

(1) CPU 8 judges whether the cord is being reeled out in Step 502: CPU 8 determines that the cord has been reeled out if sensor 7 detected a black-and-white alternative change lasting over 1 second. Otherwise, CPU 8 sets the torque to turn the motor OFF for conserving power in Step 508.

(2) When the black-and-white alternative change lasts more than 1 second, CPU 8 further judges which color has been detected at the beginning of the change in Step 503.

(2a) When the black comes first, CPU 8 measures the passing-through time required to the white that follows the black in Step 506 and stores the measured time into the resister for the white passing-through time in Step 507. After that, the flow goes back to Step 502 for judging the signal coming next.

(2b) When the white comes first, CPU 8 measures the passing-through time required to the black that follows the white in Step 504 and stores the measured time into the resister for the black passing-through time in Step 505, then continues to Step 509.

(3) In Step 509, the two values, which have been stored in resisters for the white and the black in Step 507 and Step 505, respectively, are compared with each other. If the white passing-through time is longer than the black passing-through time, CPU 8 recognizes that the unreasonable result is caused by a wrong signal or noise and determines that the cord has not moved, then controls the flow back to Step 503.

(4) If the black passing-through time is longer than the white passing-through time—the true result when the cord has been reeled out, CPU 8 further compares the value of the black passing-through time with the doubled value of the white passing-through time in Step 510.

If the value for the black is greater than the doubled value for the white, the black signal is identified as a data signal, even allowing for an error, according to the fact that the unit length of the black data signal is three times longer than that of the white part with no signal in Step 511.

Since the detected signal is not a synchronization signal, CPU 8 resets the resister for synchronization signals in Step 512, then increments the resister for data signals by 1 in Step 513. After that, CPU 8 makes a torque for rotating the motor ON, allowing the cord to be easily reeled out more in Step 514.

(5) On the other hand, if the value for the black is smaller than the doubled value for the white, CPU 8 identifies the detected signal as a synchronization signal in Step 515, and determines whether the value stored in the resister for synchronization data equals to 1, or at least 2 in Step 516.

(5a) When identifying the value in the resister for synchronization data is equal to 2 or greater, CPU 8 judges that the cord is thoroughly reeled out from the apparatus. CPU 8 therefore cuts off the torque for rotation from step motor 4 in Step 521, and then applies a high torque to stop stepper motor 4 in Step 522. As a result, the reeling-in operation is terminated at an end position of the cord.

(5b) When identifying the value in the resister for synchronization data is equal to 1, CPU 8 stores the content of the resister for data signals into the position resister for backup in Step 517, increments the countent of the resister for synchronization in Step 518, then resets the counter of the resister for data signals in Step 519. Judging from the fact that accepting a single synchronization signal is not enough to terminate the reel-in operation, CPU 8 makes the torque for rotating the motor ON in Step 520.

Thus, the mechanism of the embodiment described above allows the user to use the cord-tied pen reeled out at a desired length and after use, the pen can be automatically reeled into the apparatus.

Third Preferred Embodiment

Figure 6:
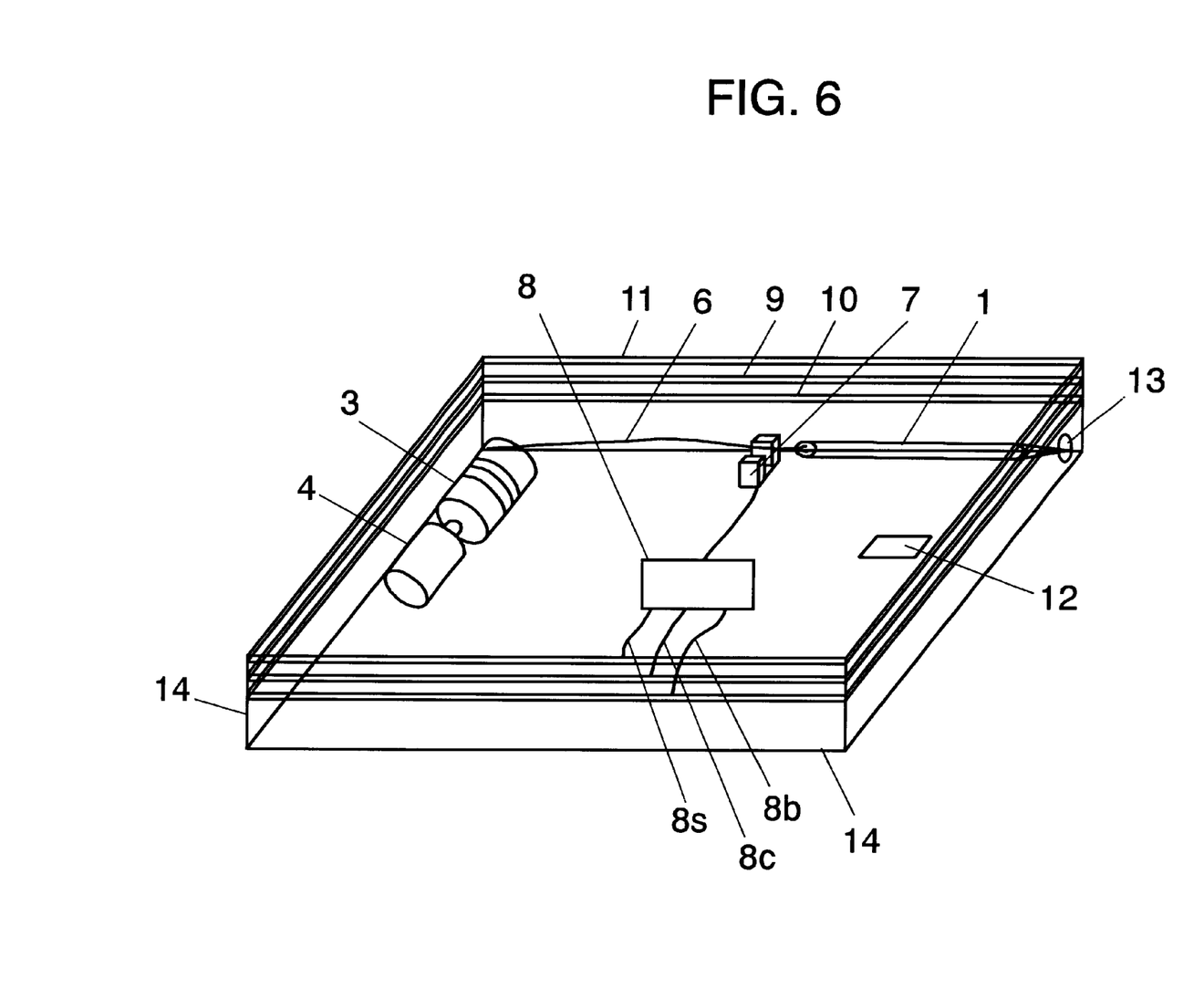
FIG. 6 is a block diagram of the electronic apparatus in accordance with a third preferred embodiment of the present invention.

FIG. 6 is a block diagram of the electronic apparatus in accordance with the third preferred embodiment of the present invention.

In addition to the structure described in the second embodiment, apparatus 14 of the third embodiment contains following components.

Display 9 and lighting device 10 are laid one upon the other beneath panel 11 in apparatus 14, as shown in FIG. 6. Besides, apparatus 14 includes housing hole 13 to house pen 1 therein, and signal lines between CPU 8 and stepper motor 4, photo sensor 7, panel 11, display 9, and lighting device 10. Display 9 shows sleep-mode virtual button (sleep icon) 12. As the structure of the position data on cord 6 is the same one as that of the second preferred embodiment shown in FIG. 3, the explanation will be omitted.

Here will be described how apparatus 14 goes into the sleep mode from the active mode.

When the user selects sleep-mode virtual button 12 using pen 1, corresponding panel signal 8s is fed into CPU 8. CPU 8 accordingly stops to power to display 9, lighting device 10, and panel 11 to bring apparatus 14 into the sleep mode.

Since pen 1 is being idle while panel 11 is in the sleep mode, CPU 8 reels up cord 6—along the same procedure described in the second preferred embodiment—to accommodate pen 1 into housing hole 13 formed in apparatus 14.

Now will be described how apparatus 14 comes back to the active mode from the sleep mode.

Even in the sleep mode, photo sensor 7 stays active. It can be responsive to the action of reeling-out pen 1 by the user. Photo sensor 7 quickly detects the data signals on cord 6 pulled out from housing hole 13 and transmits an interrupt signal to CPU 8 to bring it back from the sleep mode. Getting ready for operation, CPU 8 powers to display 9, lighting device 10, and panel 11 to bring apparatus 14 into the active mode.

Figure 7:
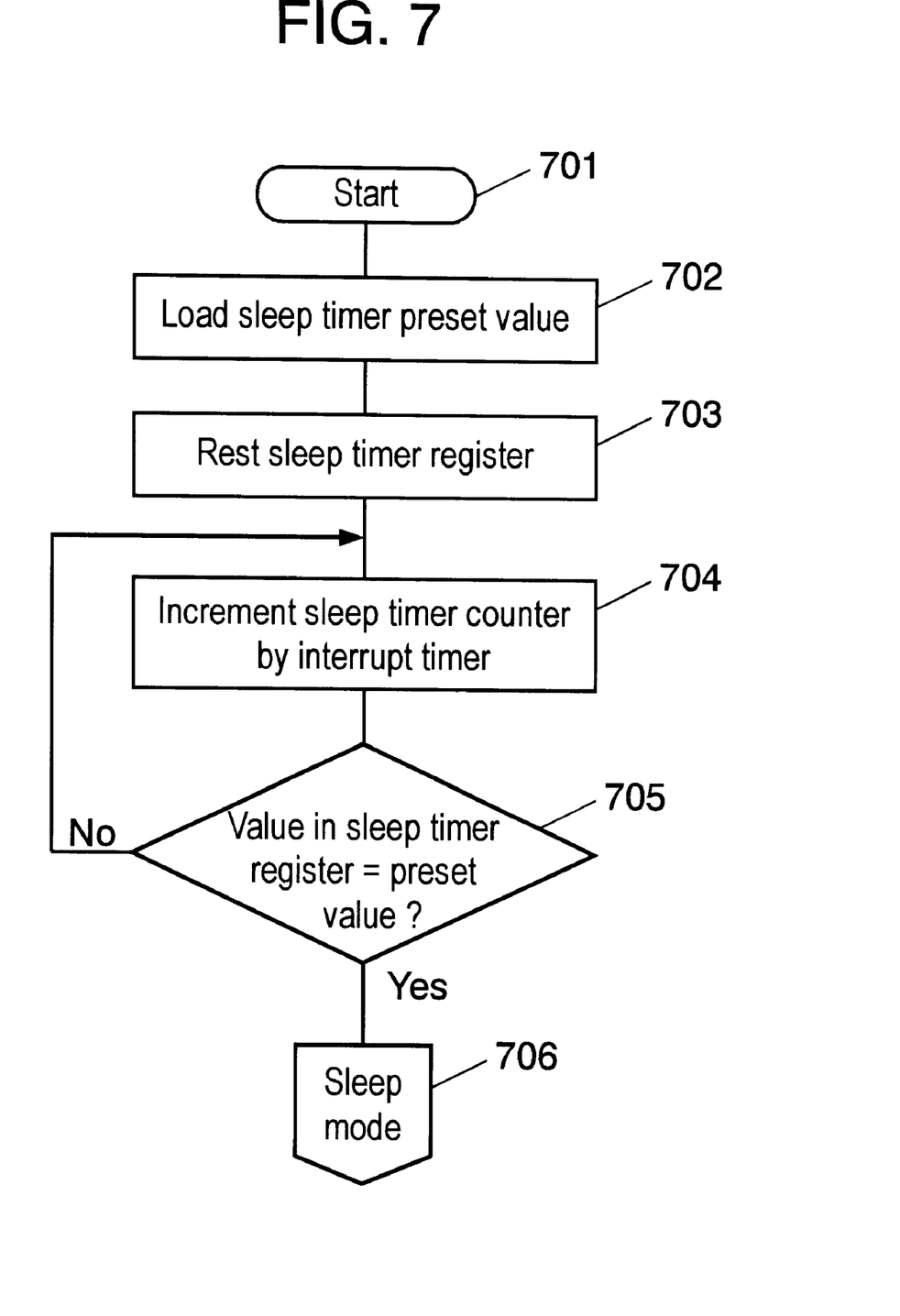
FIG. 7 is a flow chart illustrating the procedure in which the apparatus goes into the sleep mode in response to the timeout in accordance with the third preferred embodiment of the present invention.

FIG. 7 is a flow chart illustrating the procedure in which the apparatus goes into the sleep mode in response to the timeout when a timer is used instead of the sleep-mode virtual button.

The user can specify the value for the sleep timer, otherwise the default value is taken by loading in Step 702, and then the sleep-timer resister is reset in Step 703.

The counter of the resister is incremented by, for example, an interruption timer signal generated every 1 second in Step 704. In Step 705, the incremented value in sleep-timer resister is compared to the preset value for the sleep timer. If the two values are equal, apparatus 14 is brought into the sleep mode in Step 706; otherwise, the flow is brought back to Step 704 to increment the counter of the sleep-timer resister.

According to the embodiment, as described above,
 i) the pen can be automatically reeled into the apparatus when the apparatus goes into the sleep mode from the active mode; and
 ii) the apparatus instantly comes back to the active mode when the pen is reeled out during its sleep mode.

It is thus possible to realize a user-friendly electronic apparatus including a pen.

Fourth Preferred Embodiment

Figure 8:
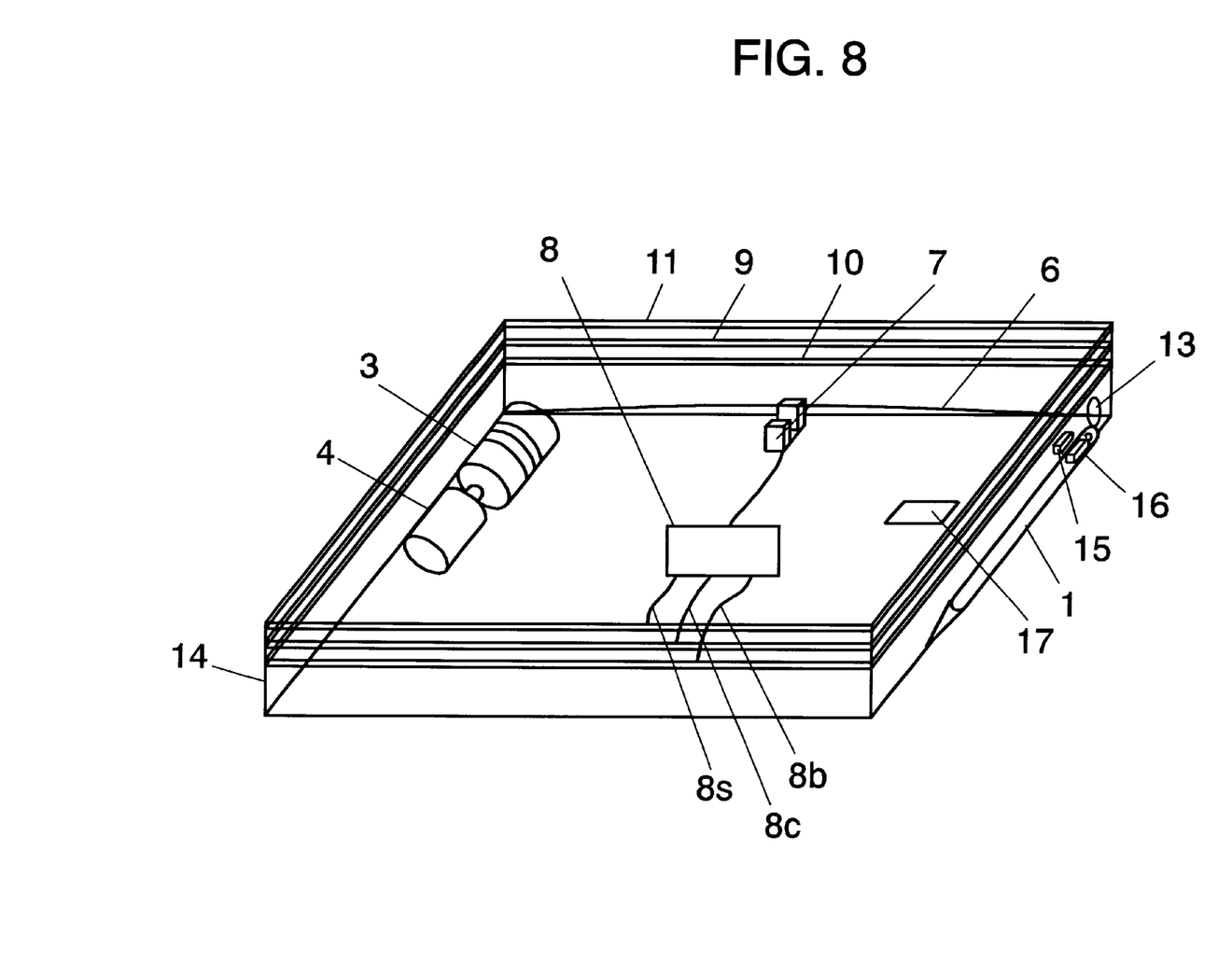
FIG. 8 is a block diagram of the electronic apparatus in accordance with a fourth preferred embodiment of the present invention.

FIG. 8 is a block diagram of the electronic apparatus in accordance with the fourth preferred embodiment of the present invention.

In the embodiment, display 9 of the apparatus displays standby-mode virtual button (standby icon) 17, instead of the sleep-mode virtual button (sleep icon) described in the third preferred embodiment. In addition, the apparatus includes magnet 16 with an S pole on pen 1 and magnet 15 with a N pole at a position close to housing hole 13.

Here will be described how apparatus 14 goes into the standby mode from the active mode.

When the user selects standby-mode virtual button 17 using pen 1, corresponding panel signal 8s is fed into CPU 8. CPU 8 accordingly stops power to display 9, lighting device 10, and panel 11 to bring apparatus 14 into the standby mode.

Since pen 1 is being idle while panel 11 is in the standby mode, CPU 8 reels up cord 6 until the upper end of pen 1 gets close to housing hole 13. Magnet 15 at housing hole 13 attracts magnet 16 on pen 1, so that pen 1 is held at a position close to hole 13.

Now will be described how apparatus 14 comes back to the active mode from the standby mode.

Even in the standby mode, photo sensor 7 stays active. It can be responsive to the action of reeling-out pen 1 against the attraction force of the magnets. Photo sensor 7 detects the data signals on cord 6 pulled out from housing hole 13 and transmits an system interrupt signal to CPU 8 to bring it back from the standby mode.

Getting ready for operation, CPU 8 supplies electric power to display 9, lighting device 10, and panel 11 to bring apparatus 14 into the active mode.

On the other hand, when apparatus 14 goes into the sleep mode from the standby mode, pen 1 is completely housed into apparatus 14 through the same procedure as that described in the third preferred embodiment.

Figure 9:
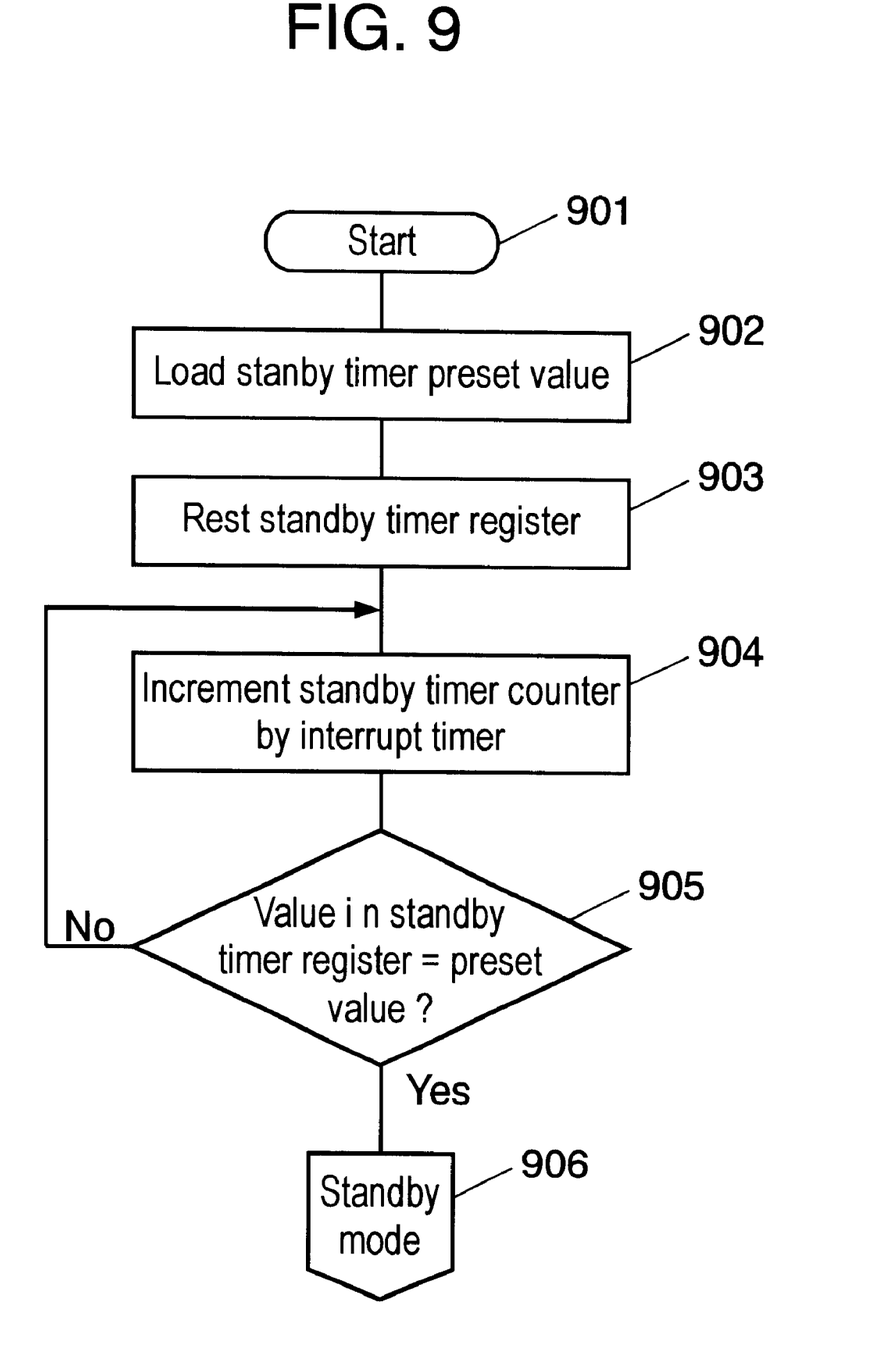
FIG. 9 is a flow chart illustrating the procedure in which the apparatus goes into the standby mode in response to the timeout in accordance with the fourth preferred embodiment of the present invention.

FIG. 9 is a flow chart illustrating the procedure in which the apparatus goes into the standby mode in response to the timeout when a timer is used instead of the standby-mode virtual button.

The user can specify the value for the standby timer, otherwise the default value is taken by loading in Step 902, and then the standby-timer resister is reset in Step 903.

The counter of the resister is incremented by, for example, an interrupt signal generated every one second in Step 904. In Step 905, the incremented value in standby-timer resister is compared to the preset value in the standby timer. If the two values are equal, apparatus 14 is brought into the standby mode in Step 906; otherwise, the flow is brought back to Step 904 to increment the counter of the standby-timer resister.

According to the embodiment, as described above,
 the pen is held at a position close to the housing hole by the attraction force of the magnets when the apparatus goes into the standby mode from the active mode; and
 the apparatus instantly comes back to the active mode when the pen is further reeled out—but the pen can be detached without effort—during its standby mode.

With the electronic apparatus of the present invention, the cord-tied pen can be automatically housed in the apparatus, which allows the user to be free from worrying about common problems in a conventional structure—dropping, spoiling, or losing. Furthermore, the pen is held at a position close to the housing hole, by an attracting force at a magnitude that the pen can be easily detached from the apparatus, when the apparatus goes into the standby mode. When the apparatus goes into the sleep mode, the pen is automatically housed into the apparatus.

By reeling-out the pen from the electronic apparatus or the position close to the hole thereof, the apparatus automatically comes back from the sleep mode or the standby mode into the active mode. Such a structure thus promises a user-friendly electronic apparatus.

What is claimed is:

1. An electronic apparatus for use with a panel and a pen as input devices, said apparatus comprising:
 a cord operable to attach the pen to the panel;
 a cord-reel section operable to reel in said cord;
 a rotating section operable to rotate said cord-reel section;
 a control section operable to request said rotating section to reel-in said cord;
 a series of position data recorded along the length of said cord;
 a readout section operable to read the position data; and
 a determining section operable to determine a position to which said cord is reeled in said apparatus;
 wherein said control section is further operable to request said cord to be reeled-in until a position indicated by the position data that is read by said readout section corresponds to the reeled-in position determined by said determining section.

2. The electronic apparatus according to claim 1, further comprising:

a timer operable to record a duration of the active mode, wherein in response to a timeout of said timer, said apparatus goes into the sleep mode and then said control section makes a reel-in request.

3. An electronic apparatus for use with a panel and a pen as input devices, said apparatus comprising:

a cord operable to attach the pen to the panel;

a cord-reel section operable to reel in said cord;

a rotating section operable to rotate said cord-reel section;

a control section operable to request said rotating section to reel-in said cord; and a timer operable to record a duration of the active mode, wherein in response to a timeout of said timer, said apparatus goes into the sleep mode and then said control section makes a reel-in request.

4. An electronic apparatus comprising:

a panel input device;

a pen input device;

a cord operable to attach said pen to said panel;

a cord-reel section operable to reel in said cord;

a rotating section operable to rotate said cord-reel section;

a control section operable to request said rotating section to reel-in said cord;

a series of position data recorded along the length of said cord;

a readout section operable to the position data; and a determining section operable to determine a position to which said cord is reeled in said apparatus;

wherein said control section is further operable to make a request that said cord be reeled-in until a position indicated by the position data that is read by said readout section corresponds to the reeled-in position determined by said determining section.

5. The electronic apparatus according to claim 4, further comprising:

a display disposed beneath said panel in overlapping relation therewith;

a first magnet disposed on said pen; and a second magnet disposed on said apparatus such that when said pen is in a first position, said first magnet and said second magnet attract one another, wherein said display is operable to show a virtual button indicating that said apparatus is in a standby mode, and wherein a pen-touch operation at a position on said panel corresponding to the virtual button allows said control section to make a request for reeling-in the cord, and then, according to the request, said rotating section is operable to reel-in said cord until said pen is in the first position where said first and second magnets attract one another.

6. The electronic apparatus according to claim 4, further comprising:

a timer operable to record a duration of the active mode, wherein in response to a timeout of said timer, said apparatus goes into the sleep mode and then said control section makes a reel-in request.

7. The electronic apparatus according to claim 4, further comprising:

a timer operable to record a duration of the active mode, a first magnet disposed on said pen; and a second magnet disposed on said apparatus such that when said pen is in a first position, said first magnet and said second magnet attract one another, wherein in response to a timeout of said timer, said apparatus goes into the standby mode, then said control section makes a reel-in request, and then, according to the request, said rotating section reels in said cord until said pen is in the first position where said first and second magnets attract one another.

8. An electronic apparatus for use with a panel and a pen as input devices, said apparatus comprising:

a cord operable to attach the pen to the panel;

a cord-reel section operable to reel in said cord;

a rotating section operable to rotate said cord-reel section;

a control section operable to request said rotating section to reel-in said cord; and a display disposed beneath said panel in overlapping relation therewith, wherein said display is operable to show a virtual button indicating that said the apparatus is in a sleep mode, and wherein a pen-touch operation at a position on said panel corresponding to the virtual button allows said control section to make a reel-in request.

9. The electronic apparatus of claim 8, wherein an operation of reeling-out said pen performed while said apparatus is in the sleep mode allows said apparatus to enter into an active mode.

10. An electronic apparatus for use with a panel and a pen as input devices, said apparatus comprising:

a cord operable to attach the pen to the panel;

a cord-reel section operable to reel in said cord;

a rotating section operable to rotate said cord-reel section;

a control section operable to request said rotating section to reel-in said cord;

a display disposed beneath said panel in overlapping relation therewith;

a first magnet disposed on said pen; and a second magnet disposed on said apparatus such that when said pen is in a first position, said first magnet and said second magnet attract one another;

wherein said display is operable to show a virtual button indicating that said apparatus is in a standby mode, and wherein a pen-touch operation at a position on said panel corresponding to the virtual button allows said control section to make a request for reeling-in the cord, and then, according to the request, said rotating section is operable to reel-in said cord until said pen is in the first position where said first and second magnets attract one another.

11. The electronic apparatus of claim 10, wherein an operation of reeling-out said pen performed while said apparatus is in the standby mode allows said apparatus to enter into an active mode.

12. An electronic apparatus for use with a panel and a pen as input devices, said apparatus comprising:

a cord operable to attach the pen to the panel;

a cord-reel section operable to reel in said cord;

a rotating section operable to rotate said cord-reel section;

a control section operable to request said rotating section to reel-in said cord; and a timer operable to record a duration of the active mode, wherein in response to a timeout of said timer, said apparatus goes into the sleep mode and then said control section makes a reel-in request.

13. An electronic apparatus for use with a panel and a pen as input devices, said apparatus comprising:

a cord operable to attach the pen to the panel;

a cord-reel section operable to reel in said cord;

a rotating section operable to rotate said cord-reel section;

a control section operable to request said rotating section to reel-in said cord;

a timer operable to record a duration of the active mode;

a first magnet disposed on said pen; and a second magnet disposed on said apparatus such that when said pen is in a first position, said first magnet and said second magnet attract one another;

wherein in response to a timeout of said timer, said apparatus goes into the standby mode, then said control section makes a reel-in request, and then, according to the request, said rotating section reels in said cord until said pen is in the first position where said first and second magnets attract one another.

* * * * *

UNITED STATES PATENT AND TRADEMARK OFFICE
CERTIFICATE OF CORRECTION

| | | |
|---|---|---|
| PATENT NO. | : 6,683,601 B2 | Page 1 of 1 |
| APPLICATION NO. | : 09/842186 | |
| DATED | : January 27, 2004 | |
| INVENTOR(S) | : Kazuo Okamoto | |

It is certified that error appears in the above-identified patent and that said Letters Patent is hereby corrected as shown below:

On the front page, in Item (56), after line 3 insert --4-28338    3/1992    JP--.

In column 10, line 3 of claim 7, change "mode," to --mode;--.

Signed and Sealed this

Twenty-seventh Day of March, 2007

JON W. DUDAS
*Director of the United States Patent and Trademark Office*